United States Patent [19]

Gould

[11] Patent Number: 4,732,092
[45] Date of Patent: Mar. 22, 1988

[54] PYROLYSIS AND COMBUSTION APPARATUS

[75] Inventor: Orval E. Gould, Mission Viejo, Calif.
[73] Assignee: G.G.C., Inc., Santa Ana, Calif.
[21] Appl. No.: 947,866
[22] Filed: Dec. 30, 1986

Related U.S. Application Data

[63] Continuation-in-part of Ser. No. 781,465, Sep. 30, 1985.

[51] Int. Cl.[4] ............................................. F23G 5/12
[52] U.S. Cl. .................................... 110/229; 110/248;
    110/256; 110/257; 110/289; 60/39.12;
    60/39.183; 60/39.41; 60/39.47; 48/76; 48/203
[58] Field of Search .................... 48/66, 68, 76, 111,
    48/194, 203, 209; 110/225, 229, 230, 248, 256,
    259, 282, 289; 60/39.12, 39.183, 39.41, 39.47

[56] References Cited

U.S. PATENT DOCUMENTS

| | | | |
|---|---|---|---|
| 1,184,351 | 5/1916 | Kidwell | 110/248 |
| 3,063,686 | 11/1962 | Irvin | 55/468 |
| 3,704,587 | 12/1972 | Krieb et al. | 60/39.12 |
| 3,759,036 | 9/1973 | White | 48/209 |
| 4,052,173 | 10/1977 | Schulz | 48/202 |
| 4,201,141 | 5/1980 | Teodorescu et al. | 110/259 |
| 4,488,398 | 12/1984 | Noguchi | 60/39.12 |
| 4,530,702 | 7/1985 | Fetters et al. | 48/209 |
| 4,635,573 | 1/1987 | Santén | 110/256 |
| 4,650,546 | 3/1987 | Le Jeune | 110/230 |

FOREIGN PATENT DOCUMENTS

| | | | |
|---|---|---|---|
| 348106 | 5/1931 | United Kingdom | 110/230 |
| 369340 | 3/1932 | United Kingdom | 110/230 |

Primary Examiner—David L. Lacey
Attorney, Agent, or Firm—Max Geldin

[57] ABSTRACT

A system for pyrolysis and combustion of combustible solid material, such as waste, which comprises a pyrolysis chamber having a series of spaced vertically disposed movable grates, forming a plurality of stages in the pyrolysis chamber and permitting downward movement of solid feed material at a controlled rate countercurrent to the upward flow of hot gaseous products, the movable grates being synchronized for successive actuation whereby the charge of feed material is successively passed through each of the stages to the bottom of the pyrolysis chamber. Inlet lines are provided for introducing air into each of such stages and into the bottom of the pyrolysis chamber. A feed-lock apparatus is provided for feeding combustible solid feed material into the upper section of the pyrolysis chamber; the feed-lock apparatus includes a hopper for receiving particulate feed material and a ram for compressing the particulate feed material into a compacted block which temporarily functions as a gas seal from the pyrolysis chamber, and for introducing the compacted block into the upper section of the pyrolysis chamber. An exit conduit is also provided for removing overhead fuel gas from the pyrolysis chamber, and an ejector is provided for introducing the overhead fuel gas from the exit conduit into a combustion chamber, and for passage of the combustion gases to a heat load. A diverter valve and throttle valve are provided in the exit conduit for selectively diverting overhead fuel gas or for throttling the process, when desired, e.g., for safety reasons. A water-filled discharge conveyor is provided for quenching the ash and other non-combustible material and carbon in the bottom of the pyrolysis chamber, and removing the resulting slurry therefrom.

13 Claims, 7 Drawing Figures

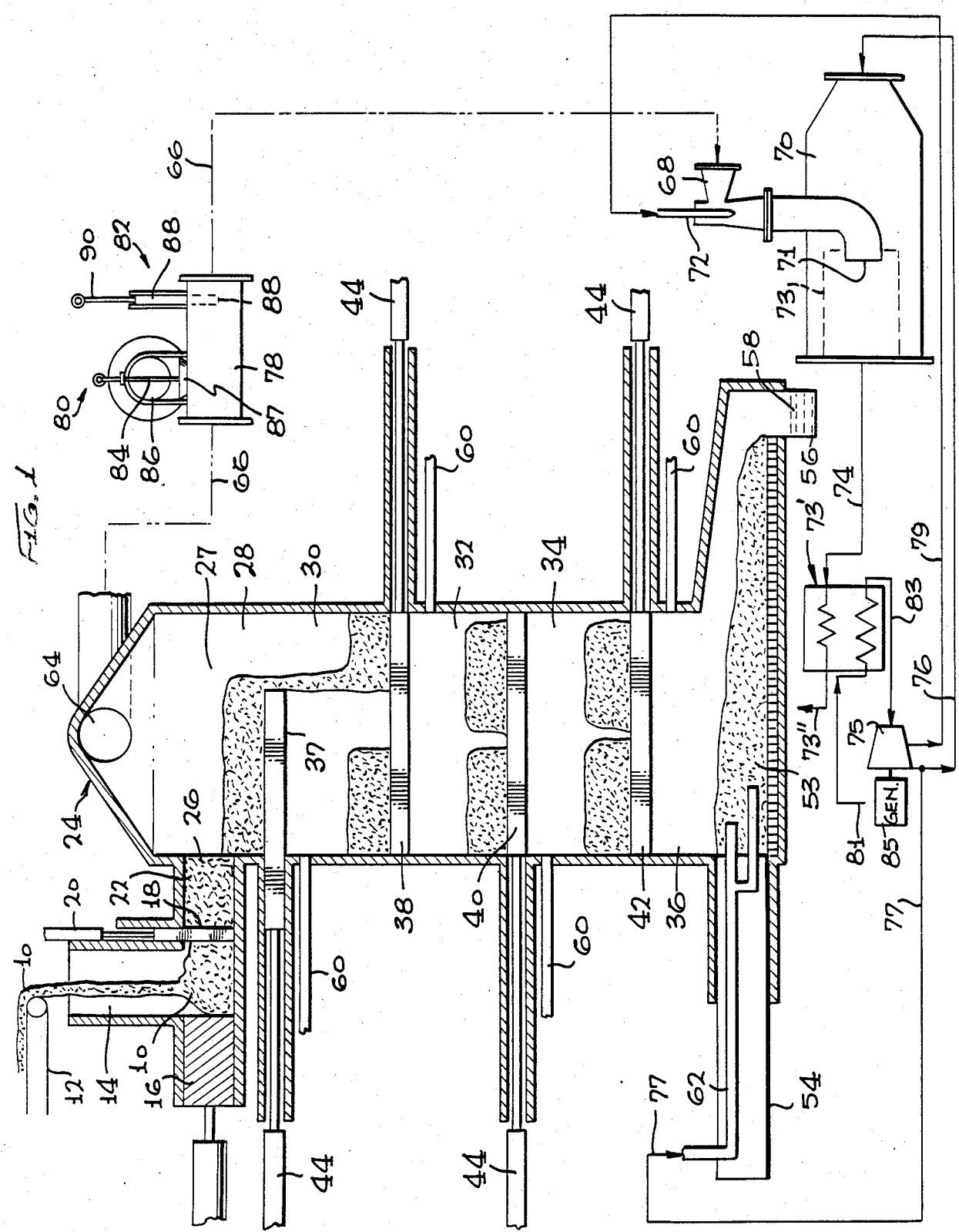

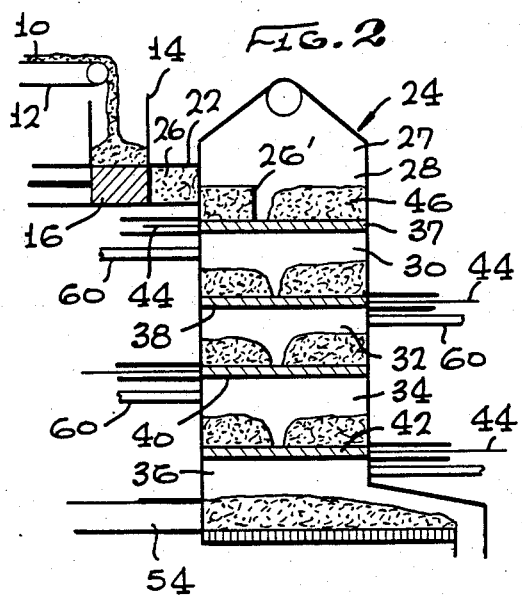
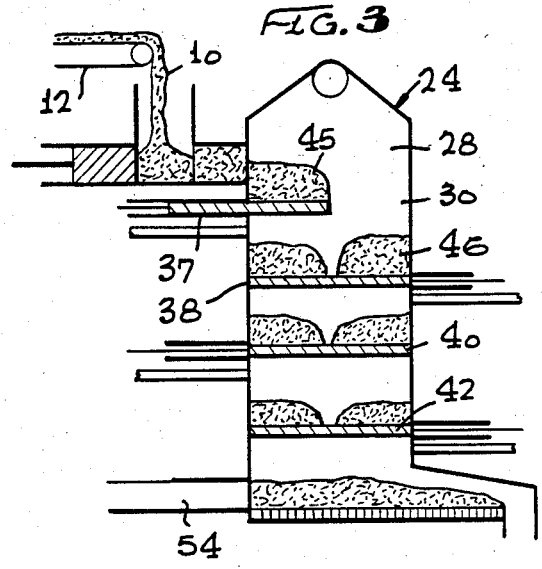
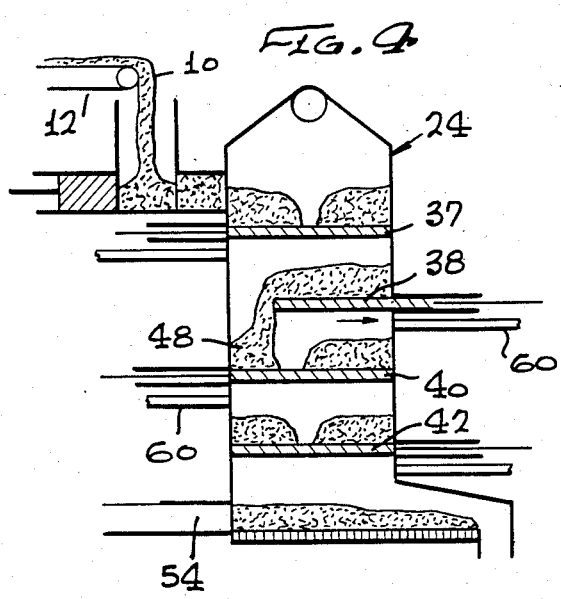
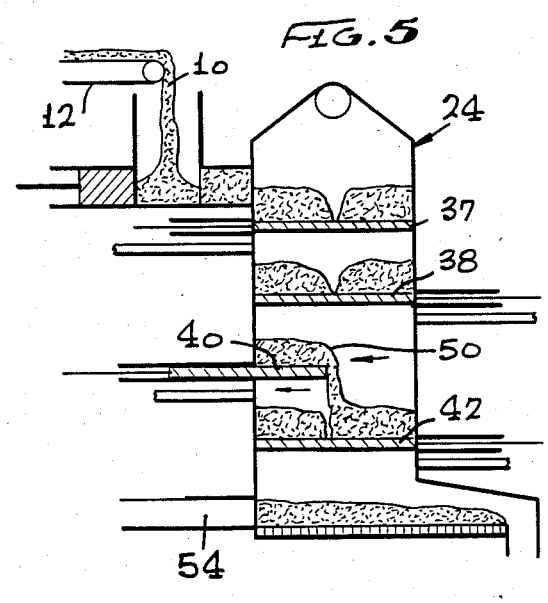
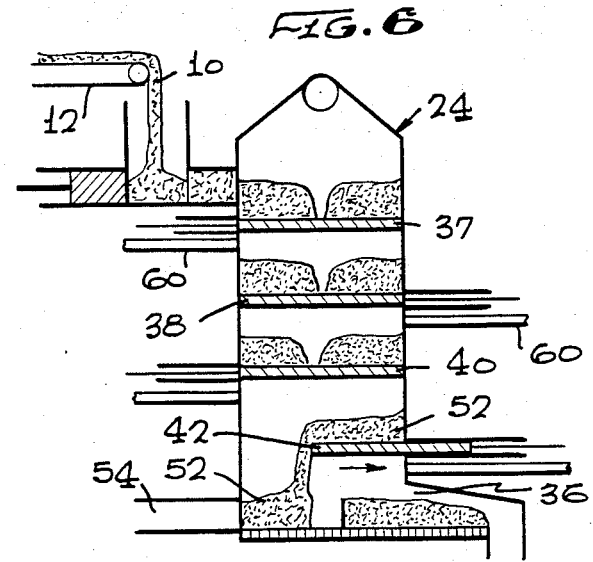
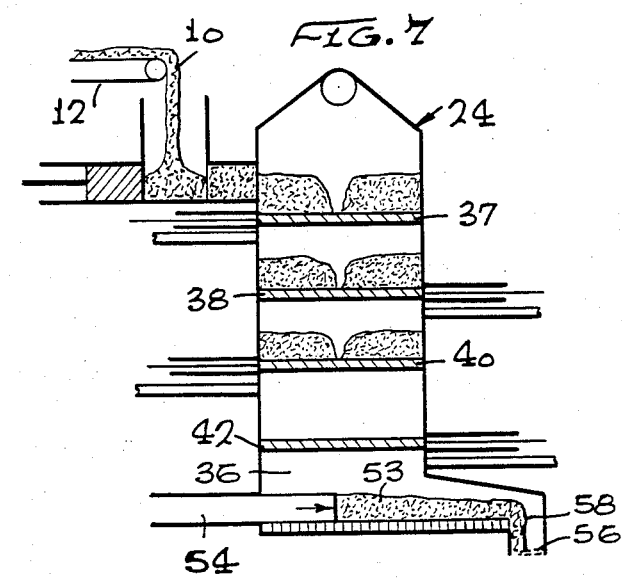

PYROLYSIS AND COMBUSTION APPARATUS

BACKGROUND OF THE INVENTION

This application is a continuation-in-part of co-pending U.S. application Ser. No. 781,465, filed Sept. 30, 1985.

This invention relates to pyrolysis of combustible solid material, and is particularly concerned with apparatus for efficiently pyrolyzing combustible solid material, such as refuse or waste, e.g., industrial waste, and then burning the combustible pyrolysis products for conversion of such solid material to heat, e.g., for driving a turbine or other heat load. The term "refuse" or "waste" as employed herein is intended to include, but is not limited to, industrial and household refuse, agricultural waste, feed lot and animal waste, unconventional fuels, biomass, and the like.

Industrial solid waste can be in the form of a combustible solid material of varying composition. A substantial proportion of such industrial waste can be primarily of a cellulosic nature, such as scrap paper, cardboard, and the like. Other types of combustible industrial waste, such as, for example, rubber truck and automobile tires, can contain acid components, such as sulfur and chlorine.

Various processes and systems have been developed heretofore for conversion of such combustible solid material, e.g., in the form of industrial waste, to heat for producing energy. Such processes and systems include pyrolysis of the combustible solid material to form a fuel gas containing carbon monoxide, and the combustion of such fuel gas to produce hot combustion gases for application to a heat load, such as a turbine. Examples of such processes and systems are disclosed in U.S. Pat. Nos. 3,759,036; 4,452,154; and 4,052,173.

However, such prior art processes and systems suffer largely from being inefficient and uneconomical.

One object of the present invention is the provision of an efficient and economical system for producing energy from combustible solid material, particularly waste material.

Another object is to provide apparatus for the controlled pyrolysis of pyrolyzable feed material to produce a fuel gas, affording flexibility to handle various feed material compositions, particularly derived from industrial waste.

A still further object of the invention is the provision of an efficient apparatus for the pyrolysis of combustible solid material, particularly waste material, and which can contain acid components, such as sulfur and chlorine.

SUMMARY OF THE INVENTION

The above objects and advantages of the invention are achieved by the provision of a pyrolysis system containing several apparatus features which, particularly in combination, provide a highly efficient system for the pyrolysis of combustible solid material, particularly waste.

One feature of the system is the provision of a pyrolysis chamber including movable actuators or grates selectively operable to control and provide uniform feed of raw material from the top to the bottom of the pyrolysis chamber without plugging or feed interruption.

Another feature is the provision of a feed-lock system for feeding the raw material in the form of a compacted charge to the movable grate at the upper end of the pyrolysis chamber, the compacted charge produced by the feeding apparatus functioning as a gas seal to prevent leakage of hot gases in the upper end of the pyrolysis chamber externally thereof via the feed apparatus.

A still further apparatus feature is the provision of a safety or diverter valve for the overhead gases from the pyrolysis chamber which can be actuated to divert overhead gases from the pyrolysis chamber to flare, if desired, and a second valve which can be actuated to throttle the pyrolysis process. The second throttle valve can be actuated, if desired, in conjunction with the diverter valve for throttling the process and at the same time diverting overhead gases, e.g., in the event that it is necessary to throttle down or shut off flow of gases from the pyrolysis chamber for any reason.

A further feature is the employment of an ejector for receiving overhead pyrolysis gas from the reactor, in combination with a burner head for combustion of overhead pyrolysis gas from the reactor and discharge of hot combustion gases to a heat load, such as a turbine.

Yet another feature of the invention apparatus is the provision of a water-filled discharge conveyor for discharging a slurry of incombustibles, including ash and carbon, from the bottom of the pyrolysis chamber.

Employing the apparatus of the invention, combustible solid material, such as industrial waste, which may be essentially carbonaceous, and which may or may not contain acid components, is introduced into a feeding apparatus which initially compresses the waste material into a compact block and the block is advanced to a point adjacent an inlet at the top of the pyrolysis chamber, the compact block essentially preventing passage of gases outwardly from the pyrolysis chamber.

The solid feed material moves downwardly at a controlled rate through multiple stage zones in the pyrolysis chamber. Such zones are separated by selectively movable grates. Thus, the compressed plug of feed material is initially dropped onto the first stage grate at the upper end of the pyrolysis chamber, and the charge is then successively moved downwardly onto the successively lower grates at a predetermined rate until the charge reaches the final stage at the bottom of the pyrolysis chamber. The successive grates commencing at the upper end of the pyrolysis chamber to the lower end thereof can be automatically actuated so as to keep the solid material moving uniformly downwardly countercurrent to the upflow of the hot gases in the chamber. The rate of downward movement of the solid feed through each stage is such that equilibrium is substantially achieved in each stage in the pyrolysis reaction between the solid combustible feed and the upwardly flowing hot combustion gases. Hot gases, which are the products of partial oxidation of carbon char, occurring at the bottom of the pyrolysis chamber, pass upwardly in the pyrolysis chamber countercurrent to the downward movement of the solid material in the chamber.

These hot gases drive off all volatile matter in the solid feed material and such volatile matter exits as overhead from the pyrolysis chamber in admixture with the gaseous products of the partial oxidation of the char. The resulting solid material, from which the volatile matter was driven off, deposits as carbon char in the lower section or bottom of the pyrolysis chamber. Air is introduced into each of the stages in the pyrolysis chamber to facilitate the pyrolysis reaction therein. Air or oxygen is also introduced into the lower section of the pyrolysis chamber into contact with the carbon char therein, partially oxidizing the char to form hot gaseous products, which can comprise hydrocarbons, carbon monoxide and hydrogen. Such hot gaseous products then flow upwardly in the pyrolysis chamber into contact with the downwardly moving solid feed material, as described above.

The temperature in each stage and the residence time of the solid material in each stage can be controlled so as to achieve equilibrium conditions therein. Thus, it is unnecessary to change the temperature of the final stage at the bottom of the pyrolysis chamber to change the temperature or residence time in any of the other stages which are individually controlled by the movement of the grates and the air inlets to the respective stages.

Ash and other non-combustible material and carbon are removed from the bottom of the pyrolysis chamber by the water-filled char discharge conveyor, noted above.

The raw fuel gas which is removed as overhead and which can comprise hydrocarbons, carbon monoxide, hydrogen and nitrogen, is at a controlled elevated temperature, e.g., about 800° F. to about 1,000° F. The temperature of the overhead gas is controlled by controlling the flow rate of air into the carbon char for partial oxidation thereof.

The hot fuel gas exiting the pyrolysis chamber is introduced into the above-noted ejector apparatus of the invention for discharge into a combustion chamber and the resultant hot combustion gases are applied to a heat load, e.g., in the form of a turbine, boiler, or other head load.

The above-noted diverter valve and throttle valves are disposed in the overhead gas line from the pyrolysis chamber for diverting gas from the pyrolysis chamber or to throttle the process.

BRIEF DESCRIPTION OF THE DRAWINGS

A better understanding of the invention may be had by reference to the following description, taken in conjunction with the accompanying drawings in which:

FIG. 1 is an elevational view of the pyrolysis chamber and associated apparatus of the invention for pyrolysis and burning of combustible solid material for the production of energy; and FIGS. 2-7 illustrate operation of the pyrolysis apparatus of the invention, particularly the successive actuation of the movable grates, as the feed material moves downwardly through the various stages in the pyrolysis chamber.

DETAILED DESCRIPTION OF THE INVENTION AND PREFERRED EMBODIMENTS

Referring to FIGS. 1 and 2 of the drawings, combustible solid material, such as industrial waste, is first prepared, as by shredding, for use as a feed material to the pyrolysis reactor of the invention. Such industrial waste can vary in composition and is preferably primarily a cellulosic material, such as scrap paper, cardboard, wood chips and the like. The waste or refuse should be manually cleared of hazardous wastes.

The feed material at 10 is transported on an input conveyor 12 and discharged into an inlet hopper 14. A charging ram 16 is positioned adjacent the lower end of the hopper 14 for lateral movement into the hopper against the pile of feed material in the lower end thereof. Also adjacent the lower end of the hopper and on the opposite side thereof from the ram 16 is a gate 18 which in its lowered position as shown in FIG. 1 closes one side of the hopper at the bottom thereof, while the charging ram 16 closes the opposite side of the hopper at the bottom thereof. The gate 18 can be actuated at its upper end 20 to raise the gate and provide communication between the hopper 14 and an inlet 22, which is in communication with the upper end of a pyrolysis chamber 24.

Thus, at a predetermined time, the charging ram 16 is actuated to move to the right, viewing FIG. 1, into the lower end of the hopper 14 against the pile of feed material 10 therein, compressing the feed material against the gate 18. The gate 18 is then lifted, permitting the ram 16 to continue to move to the right and forcing the resulting compacted charge or block 26 of feed material 10 into the inlet 22. The feed material is sufficiently compacted in the block 26 so that the block 26 in the inlet 22 functions as a gas seal between the interior of the pyrolysis chamber 24 and the exterior atmosphere. After discharge of the compacted feed block 26 from the feed hopper 14 to the inlet 22, as seen in FIG. 2, the ram 16 is retracted out of the hopper 14 to its position shown in FIG. 1, to permit additional feed material to be discharged into the bottom of the hopper. As seen in FIG. 2, when the charging ram 16 forces the block of feed material 26 into the inlet 22, the feed block 26', previously in inlet 22, is pushed by block 26 into the upper end 27 of the pyrolysis chamber 24.

The feed block 26' introduced into the upper end of the pyrolyzer 24 eventually moves downwardly therein through five separate stages, 28, 30, 32, 34 and 36, in countercurrent flow to hot combustion gases passing upwardly in the pyrolyzer, and which are the products of partial oxidation of carbon char, occurring in the bottom of the pyrolysis chamber, as further described below. Such stages are separated by a plurality, here shown as four in number, of vertically spaced movable grates 37, 38, 40 and 42. Each of the grates is horizontally movable within the pyrolysis chamber 24 by means of actuators indicated at 44. The movable grates maintain the solid combustible material on a grate in each of the stages for a predetermined time interval and are selectively actuated to move the solid material uniformly downwardly in the pyrolyzer at a controlled rate, and preventing plugging of the pyrolyzer while permitting uniform upward flow of hot gas through the downwardly moving solid mass, without channeling or formation of vapor pockets in the feed material, and achieving substantial reaction equilibrium at each stage in the pyrolysis reaction.

Thus, the compressed feed plug 26' is initially dropped onto grate 37 of the first stage 28, as shown in FIG. 2, where restricted air distills off gases in the feed block 26' and transforms it into a porous bulk particulate feed material shown at 45 in FIG. 3. When the feed block 26' is dropped onto grate 37, it shoves the previously formed bulk feed material at 45 over to form the pile of feed material at 46. The top grate 37 is then actuated and retracted to drop the charge of feed material at 46 to the second stage grate 38, as seen in FIG. 3, and the grate is then advanced to its full position shown in FIG. 4. The second stage 30 is hotter than the first stage 28 and distills off more gases.

The second grate 38 is then retracted, as shown in FIG. 4, and the partly distilled charge 48 on the far end of the grate is pushed off onto the third stage grate 40, after which grate 38 is advanced to its fully closed position shown in FIG. 5.

The third stage grate 40 is then retracted as shown in FIG. 5, and the char 50 on the far end of the grate is then delivered to the fourth stage grate 42, after which grate 40 is again advanced to its fully closed position shown in FIG. 6.

Referring to FIG. 6, the resulting char 52 on grate 42 is then emptied into the final stage 36 at the bottom of the pyrolysis chamber, after which grate 42 is advanced to its fully closed position shown in FIG. 7. In final stage 36, combustion is carried out to completely reduce the charge 52.

It will be understood that a portion of fines in the solid material supported on the grates in each stage will pass downwardly through the apertures in the grates, to the stage below.

Now referring to FIG. 7, the charge 53 remaining in the bottom of the pyrolysis chamber following combustion and comprised of ash and other non-combustible material and remaining carbon, resulting from the partial oxidation of the carbon char in the bottom of the pyrolysis chamber, is pushed by means of a char push-off ram 54 onto a discharge conveyor 56 where it is quenched with water to form a slurry at 58, and the resulting slurry is then removed from the bottom of the pyrolysis chamber.

Metered air injection is provided into each of the stage zones 30, 32, 34 and 36 via each of the inlet lines 60, positioned just below each of the movable grates, and such metered air, in conjunction with the movement of the grates, maintains the desired reaction temperature in each zone. Additional air injection is metered into the final stage zone 36 at the bottom of the pyrolysis chamber, via inlet 62. Such injected air is preferably at elevated temperature, e.g., about 1000° F. However, the air introduced into each of the stages via inlets 60 can range from ambient temperature to about 1000° F.

The pyrolysis reactor 24 is operated under a negative pressure so that any leakage will be inward. The reactor can be instrumented and computer controlled, employing a microprocessor to actuate the grates at preselected time intervals, according to the operational scheme described above.

In the pyrolysis chamber, which may have a temperature ranging from about 1400° F. to about 1600° F. at the bottom, to about 800° F. to about 1000° F. at the top, the hot combustion gases passing upwardly from the bottom of the pyrolysis chamber, and in contact with the solid combustible material passing countercurrently downward, drives off the volatile matter in the solid material and pyrolyzing it to carbon char which deposits at the bottom of the pyrolysis chamber. Thus, as the hot gases move upwardly, all of the volatile materials in the raw feed material, which can include hydrocarbons, such as methane and heavier hydrocarbons, are vaporized from the incoming material.

The overhead which exits the top of the pyrolysis chamber at 64 consists of a mixture of the hot partial oxidation combustion gases, together with the volatile gases given off in the solid feed material, and comprising a mixture of hydrocarbons of varying molecular weights ranging from methane to decane, carbon monoxide, hydrogen and nitrogen. The raw fuel gas which thus exits the top of the pyrolyzer can have a temperature ranging, for example, from about 800° F. to about 1000° F.

The raw hot fuel gas overhead exiting the top of the pyrolysis chamber at below atmospheric pressure is then passed via line 66 into an ejector 68, into which is also introduced hot air, e.g., at 440° F., at 72. The ejector maintains a slight negative pressure in the pyrolysis chamber. The hot fuel gas exiting the ejector is introduced into the burner head 71 and the burner can 73 in a combustion chamber 70, wherein the fuel gas is subjected to combustion at a temperature, e.g., of about 2800° F.

The resulting hot combustion gases exiting the combustion chamber at 74, and at a temperature, e.g., of about 1600° F. to about 1700° F., is introduced into a heat exchanger or recuperator 73', and the spent combustion gas is exhausted to the atmosphere at 73". Compressed air at 81 is passed into heat exchange relation with the hot combustion gas in the recuperator, and the heated compressed air at 83 is fed to a gas turbine 75 which drives a generator 85.

The oxygen carrying gas turbine exhaust at 76 is introduced into the combustion chamber 70 to increase the efficiency of the combustion reaction. A minor portion of the turbine exhaust 76, e.g., about 10%, and containing about 18% $O_2$ and at a temperature of about 1000° F., is bled off and is introduced at 77 into the combustion air inlet 62 to the bottom of the pyrolysis chamber. A portion of the turbine exhaust can also be used to supply inlet air at 60 into each of the stages in the pyrolysis chamber. The hot air introduced into the ejector at 72 is provided by the bleed air at 79 from the compressor stage of the turbine.

In the overhead fuel gas line 66, there is provided a manifold 78 containing a diverter valve 80 and a throttle valve 82. If desired, e.g., in response to excessive pressure of the overhead fuel gas due to a malfunction or failure in the system, the valve head 87 of valve 80 can be raised by member 84 to open the valve and divert the fuel gas through exit line 86 to storage or to flare. The throttle valve 82 is comprised of a member 88, which can be actuated by a rod 90 to lower member 88 into the manifold 78 to throttle the fuel gas overhead partially or entirely. Valve 82 can be operated separately or in conjunction with the actuation of the diverter valve 80 for diversion of the overhead fuel gas through exit line 86 and/or to throttle or to completely shut down the process.

The following is an example of practice of the present invention:

According to the invention process and system illustrated in the drawings and described above, combustible shredded waste is processed utilizing about 50 tons per day, which produces, on the average, 4,500 Btu per pound of energy.

The bottom of the pyrolysis chamber operates at a temperature of about 1600° F. with an input of about 180 moles per hour of air at 1000° F. into the bottom of the pyrolyzer. Inlet air is introduced into each of the stages at about 1000° F.

Overhead combustible gas at a temperature of about 1000° F. exits the top of the pyrolyzer in an amount of about 275 moles per hour. The combustible gas is introduced into an ejector, into which is also introduced air at 4 atmospheres pressure and 1400° F. in an amount of 20 moles per hour. The ejector maintains a slight negative pressure in the pyrolysis chamber.

The raw hot fuel gas exiting the ejector and at a slight positive pressure is introduced into a combustion chamber. Combustion air at 1000° F. and in an amount of about 3400 moles per hour is fed to the combustion chamber.

Hot combustion gases at a temperature of 1600° F. exit the combustion chamber and are passed to a heat exchanger to extract about 18 million Btu per hour of energy, and the gases heated in the heat exchanger are passed into a turbine.

Where the raw feed material consists essentially of a cellulosic material and contains pollutants, e.g., in the form of one or more acid constituents, such as sulfur and chlorine as, for example, industrial waste in the form of scrap truck and automobile tires, the raw overhead fuel gas at 64 can be initially cleaned by introducing same into a bed of a chemical adsorbent, not shown, such as calcium carbonate, or any other acid adsorbent, such as bentonite or sodium carbonate. The resultant clean fuel gas, e.g., at a temperature of about 800° F. to about 1000° F. is then reintroduced into line 66 for passage via ejector 68 into the combustion chamber 70. This feature is described in detail in my above copending application and is incorporated herein by reference.

From the foregoing, it is seen that the invention provides an efficient counterflow, multiple-stage pyrolysis system and apparatus for conversion of combustible solid material to a hot fuel gas, and for combustion of such fuel gas, including a variety of novel apparatus features. The invention system and apparatus are markedly different from that of the prior art, e.g., as represented by the above patents, and successfully pyrolyzes solid material, particularly industrial waste, and then burns the combustible pyrolysis products, in a manner different from that disclosed in the above patents, and which provides the highest efficiency, is relatively simple to control, and can be made environmentally acceptable.

Since various changes and modifications of the invention will occur to and can be made readily by those skilled in the art without departing from the invention concept, the invention is not to be taken as limited except by the scope of the appended claims.

What is claimed is:

1. A system for pyrolysis and combustion of combustible solid material which comprises
    a pyrolysis chamber having an upper section and a lower section,
    a feed-lock apparatus for feeding combustible solid feed material into the upper section of said pyrolysis chamber, said feed-lock apparatus including a hopper for receiving particulate feed material, means for compressing the particulate feed material into a compacted block, and means for introducing the compacted block into said upper section of the pyrolysis chamber,
    a series of spaced, vertically disposed, horizontally movable grates in said pyrolysis chamber, forming a plurality of stages in said pyrolysis chamber and permitting downward movement of the solid material at a controlled rate through said stages counter current to the upward flow of hot gaseous products of the partial oxidation of carbon char, and driving off volatile matter in the solid material,
    means for introducing air into each of said stages,
    means for introducing additional air into the lower section of said pyrolysis chamber into contact with charbon char deposited therein from the solid material, for partially oxidizing the carbon char, and forming hot gaseous products,
    means for removing ash and other non-combustible material and carbon, from the bottom of said chamber, and
    means for removing a hot overhead fuel gas from said pyrolysis chamber.

2. The system of claim 1, said system further including means for selective successive actuation of the grates from the top grate of said series of grates to the bottom grate, whereby the charge of feed material is successively passed through each of said stages from the upper section to the bottom of said pyrolysis chamber.

3. The system of claim 1, wherein said feed lock apparatus includes an inlet positioned entirely externally of said pyrolysis chamber but communicating with the upper section of said pyrolysis chamber for receiving a compacted block of feed material, the compacted block functioning as a gas seal prior to introduction thereof in unreacted form into the upper section of said pyrolysis chamber.

4. The system of claim 1, wherein said means for compressing particulate feed material includes a movable ram, said hopper having a lower end, said movable ram arranged to be introduced into the lower end of said hopper to compress the particular feed material into a compacted block, said feed lock apparatus also including
    a movable closure member adjacent the lower end of said hopper, and
    an inlet conduit between the lower end of said hopper and said upper section of the pyrolysis chamber, for receiving the compacted block from said hopper when said closure member is moved to permit said ram to force the block into said inlet conduit, the compacted block functioning as a gas seal for said pyrolysis chamber when positioned in said inlet conduit.

5. The system of claim 1, said means for removing a hot overhead fuel gas from said pyrolysis chamber comprising an exist conduit,
    a combustion chamber,
    means for introducing the overhead fuel gas from said exit conduit into said combustion chamber for combustion of the fuel gas therein,
    a heat load, and
    means for applying the resulting combustion gases to said head load.

6. The system of claim 5, including
    a diverter valve in said exit conduit for selectively diverting the overhead fuel gas from said exit conduit prior to introduction of such fuel gas into said combustion chamber, and
    a throttle valve in said conduit for throttling the overhead fuel gas in said exit conduit.

7. The system of claim 6, including a manifold in said exit conduit, said diverter valve and said throttle valve being positioned adjacent each other in said manifold.

8. The system of claim 5, said means for introducing the overhead fuel gas from said exit conduit into said combustion chamber comprising an ejector, and including means for introducing air into said combustion chamber via said ejector.

9. The system of claim 1, said means for removing ash and other non-combustible material and carbon from the bottom of said chamber comprising a water-filled discharge conveyor for quenching the ash and other non-combustible material and carbon, and for removing the resulting slurry from the bottom of said pyrolysis chamber.

10. A system for pyrolysis and combustion of combustible solid material which comprises a pyrolysis chamber having an upper section and a lower section, a feed-lock apparatus for feeding combustible solid feed material into the upper section of said pyrolysis chamber, said feed-lock apparatus including a hopper for receiving particulate feed material, means for compressing the particular feed material into a compacted block, and means for introducing the compacted block into said upper section of the pyrolysis chamber, a series of spaced, vertically disposed, horizontally movable grates in said pyrolysis chamber, forming a plurality of stages in said pyrolysis chamber and permitting downward movement of the solid material at a controlled rate through said stages countercurrent to the upward flow of hot gaseous products of the partial oxidation of carbon char, and driving off volatile matter in the solid material, means for selective successive actuation of the grates from the top grate of said series of grates to the bottom grate, whereby the charge of feed material is successively passed through each of said stages to the bottom of said pyrolysis chamber, an air inlet into each of said stages, means for introducing additional air into the lower section of said pyrolysis chamber into contact with carbon char deposited therein from the solid material, for partially oxidizing the carbon char, and forming hot gaseous products, means for removing ash and other non-combustible material and carbon from the bottom of said chamber, an exit conduit for removal of overhead fuel gas from said pyrolysis chamber, a combustion chamber, means for introducing the overhead fuel gas from said exit conduit into said combustion chamber for combustion of the fuel gas therein, a heat load, means for applying the resulting combustion gases to said heat load for production of energy, a diverter valve in said exit conduit for selectively diverting the overhead fuel gas from said conduti prior to introduction of such fuel gas into said combustion chamber, and a throttle valve in said conduit for throttling the overhead fuel gas in said exit conduit.

11. The system of claim 10, wherein said means for compressing particulate feed material includes a horizontally movable ram, said hopper having a lower end, said movable ram arranged to be introduced into the lower end of said hopper to compress the particulate feed material into the compacted block, said feed-lock apparatus also including a movable closure member adjacent the lower end of said hopper, and an inlet conduit between the lower end of said hopper and said upper section of the pyrolysis chamber and positioned entirely externally of said pyrolysis chamber, for receiving the compact block from said hopper when said closure member is moved to permit said ram to force the block into said inlet conduit, the compacted block function as a gas seal for said pyrolysis chamber when positioned in said inlet conduit.

12. The system of claim 11, said means for introducing the overhead fuel gas from said exit conduit into said combustion chamber comprising an ejector and including means for introducing air into said combustion chamber via said ejector, said means for removing ash and other non-combustible material and carbon from the bottom of said pyrolysis chamber comprising a water-filled discharge conveyor for quenching the ash and other non-combustible material and carbon, and for removing the resulting slurry from the bottom of said pyrolysis chamber.

13. A system as defined in claim 10, said heat load being a gas turbine, said means for applying the combustion gases to said heat load including a heat exchanger, means for passing compressed air in heat-exchange relation with the combustion gases in said heat exchanger, means for feeding the resulting heated compressed air to said gas turbine, means for introducing oxygen-containing gas turbine exhaust into asid combustion chasmber, and means for bleeding off a minor portion of the oxygen-containing gas turbine exhaust and introducing same into the lower section of said pyrolysis chamber.

* * * * *